United States Patent [19]
Barabash et al.

[11] Patent Number: 6,101,378
[45] Date of Patent: *Aug. 8, 2000

[54] PRE-PAID CELLULAR TELEPHONE SYSTEM

[75] Inventors: Darrell Barabash, Grapevine; Russell Morris, Keller, both of Tex.

[73] Assignee: Japan Radio Co., Ltd., Mitaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/698,508

[22] Filed: Aug. 15, 1996

[51] Int. Cl.[7] .............................. H04Q 7/20; H04M 11/00
[52] U.S. Cl. ........................ 455/406; 455/410; 455/405; 455/407
[58] Field of Search .................................... 455/405, 406, 455/407, 408, 558, 522, 410, 411; 379/111, 114, 144, 357, 93.01; 375/222

[56] References Cited

U.S. PATENT DOCUMENTS

| | | | |
|---|---|---|---|
| 5,376,931 | 12/1994 | Marrs | 340/825.44 |
| 5,485,486 | 1/1996 | Gilhousen et al. | 455/522 |
| 5,577,100 | 11/1996 | McGregor et al. | 455/406 |
| 5,592,535 | 1/1997 | Klotz | 455/406 |
| 5,682,602 | 10/1997 | Walker et al. | 375/222 |
| 5,722,067 | 2/1998 | Fougnies et al. | 455/406 |
| 5,748,720 | 5/1998 | Loder | 379/144 |

*Primary Examiner*—Dwayne D. Bost
*Assistant Examiner*—Nay Maung
*Attorney, Agent, or Firm*—Cesari and McKenna, LLP

[57] ABSTRACT

A cellular telephone system maintains a database of prepaid cellular telephone service accounts, including an amount of money remaining in each account. The system uses modems in a blank-and-burst mode to send data and commands over a voice channel. When a call is attempted over a mobile unit, the system sends identification information stored in the mobile unit to a debit processing unit, which then permits the call and debits the associated account if a sufficient amount of money remains in the account, otherwise it terminates the call.

19 Claims, 3 Drawing Sheets

PRE-PAID CELLULAR TELEPHONE SYSTEM

BACKGROUND OF THE INVENTION

1. Field of the Invention

The invention relates to cellular telephone systems and, more particularly, to such systems that provide prepaid cellular telephone service.

2. Description of the Related Art

In an effort to minimize defaults in payment for services, a provider of cellular telephone services may refuse to enroll a new subscriber unless the subscriber has a credit rating that exceeds certain minimum standards. Consequently, potential cellular telephone subscribers who have poor credit ratings cannot obtain cellular telephone service, even if they are financially capable of paying for it. In addition, a subscriber who meets the minimum credit standards exposes himself to potentially large bills if his mobile telephone unit (mobile unit) is used fraudulently or if a thief alters another mobile unit to mimic the "electronic serial number" (ESN) of the subscriber's mobile unit. Furthermore, some potential cellular telephone subscribers would prefer to subscribe for short periods of time, e.g., during a business trip or while traveling on vacation, but the providers of cellular telephone services generally require new customers to enroll for at least one year and bill only for whole-month periods.

SUMMARY OF THE INVENTION

The invention is a cellular telephone system in which a subscriber prepays for cellular telephone services and the system completes a call only if a sufficient balance of money remains in the subscriber's account to cover the cost of the call. The system thus enables providers of cellular telephone services to provide prepaid services to subscribers regardless of their credit ratings. A subscriber can also budget his use of the cellular telephone system by periodically, e.g. monthly, prepaying for the service. In addition, a subscriber can limit his liability for fraudulent use of his mobile unit to the balance in his account.

The system maintains a database containing the balance of money in each subscriber's account and it debits the account as the subscriber's mobile unit makes or receives calls. When a user attempts to make a call with a subscriber's mobile unit or when another party attempts to call the mobile unit, the mobile unit communicates, i.e., exchanges data, with a debit processing unit (DPU), which accesses the database to ascertain whether the subscriber's account contains a sufficient balance for the proposed call. If not, the DPU instructs the system to deny the call and, optionally, it instructs the mobile unit to disable itself from attempting further calls. On the other hand, if the account contains a sufficient balance, the DPU instructs the system to complete the call. During the call, the DPU periodically debits the account for air time and toll charges incurred as a result of the call and, if the balance becomes insufficient for additional air time or toll charges, the DPU can instruct the system to terminate the call.

The mobile unit communicates with the DPU by sending and receiving bursts of data over the voice channel of the cellular telephone system. Advantageously, exchanging data over the voice channel avoids requiring the service provider to seek regulatory approval or make any changes to existing base stations. The mobile unit and the DPU each employs a modem to modulate the data onto the voice channel, preferably using audio frequency-shift keying (AFSK). Preferably, the system uses a technique known as "blank-and-burst," in which the system disables the normal audio path during a burst of data to avoid voice-signal interference with the data. The bursts do not significantly degrade the normal voice signals because the bursts are short, i.e., generally less than one second in duration.

The modems overcome the problem of differentiating data signals from voice signals by constantly sampling the signal carried over the voice channel to detect the beginning of a burst of data. Each burst contains with a predetermined pattern of bits (a "synchronization word") near its beginning that enables the receiving modem to identify the burst. The bit pattern of the synchronization word is chosen to minimize the probability that normal signals carried over the voice channel, e.g., speech, facsimile signals or computer modem signals, contain the modulated-equivalent of the synchronization word.

The system thus provides a data channel between the mobile unit and the DPU. The data channel can be used seemingly concurrently, and without interfering, with the normal voice signals to send commands and/or data between the mobile unit and the DPU. For example, during a call the DPU can periodically send the balance remaining in the subscriber's account and the mobile unit can display this balance on its display screen to keep the subscriber apprised of the balance. Optionally, when making or answering a call, the user of the mobile unit can enter a maximum amount of money that he wishes to have debited as a result of the call. When this amount has been debited, the mobile unit, or optionally the DPU, can automatically terminate the call after giving an appropriate warning message. Data transmitted over the data channel can be encrypted so that, for example, a user can be required to enter a personal identification number (PIN) before making or receiving each call. After encrypting the PIN, e.g. using an algorithm that includes a time stamp, the mobile unit can send it to a base station or DPU for validation with little chance of its being intercepted by a potential thief.

BRIEF DESCRIPTION OF THE DRAWINGS

The above and further advantages of the invention may be better understood by referring to the following description in conjunction with the accompanying drawings, in which.

DESCRIPTION OF THE PREFERRED EMBODIMENT

Figure 1:
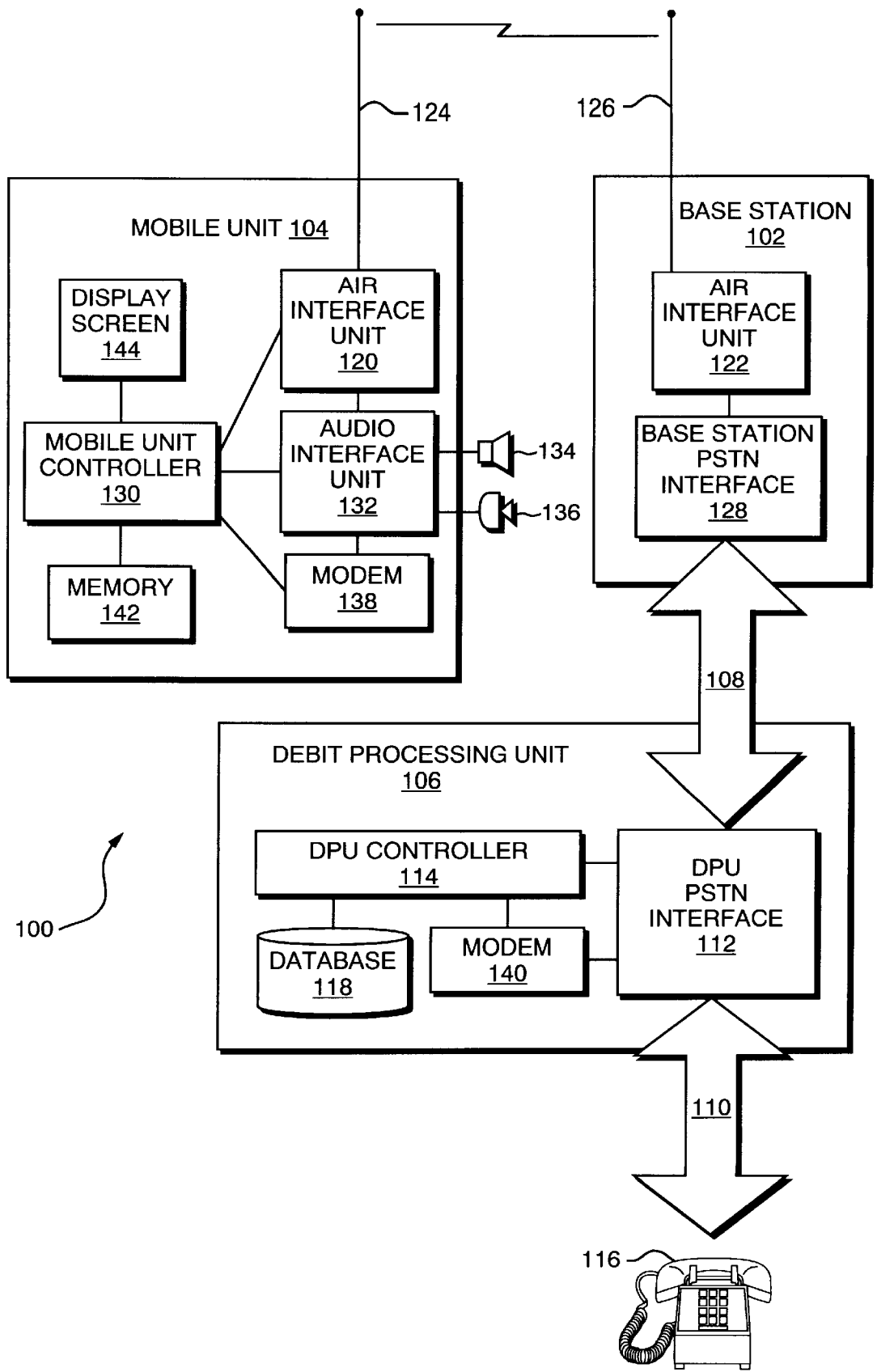
FIG. 1 is a block diagram of a wireless communication system according to the present invention.

FIG. 1 depicts a radiotelephone system 100 according to the present invention, in which a base station 102 is in two-way radio communication with a mobile unit 104 and is connected to a debit processing unit (DPU) 106 by a link 108. The link 108 can be provided over a public switched telephone network (PSTN) or over a separate link. The DPU 106 is connected to the PSTN 110 through a DPU-PSTN interface 112. Under the control of a DPU controller 114, the DPU 106 selectively permits or prevents the completion of calls between the mobile unit 104 and a dialed or dialing telephone unit (hereinafter collectively referred to as a "dialed unit") 116 on the PSTN 110 depending on whether a database 118 indicates that a sufficient balance of money remains in the appropriate account.

Figure 2:
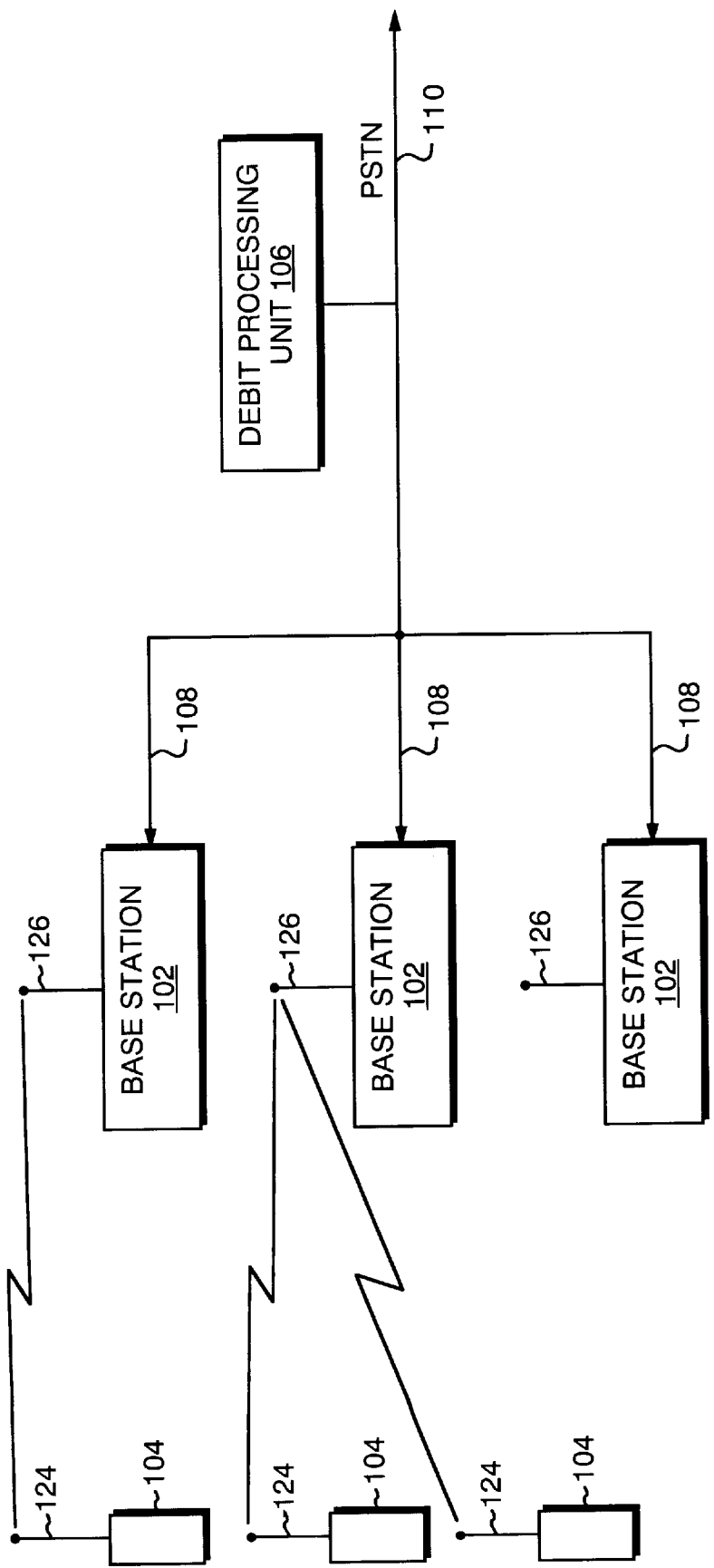
FIG. 2 is a less detailed block diagram of a larger wireless communication system than the one shown in FIG. 1.

As shown in FIG. 2, one DPU 106 can be connected to several base stations 102 and can control calls involving many mobile units 104. The links 108 between the base stations 102 and the DPU 106 can be permanent or switched, wire or wireless connections, preferably over the PSTN 110. Alternatively, the DPU 106 can be co-located with one of the base stations 102.

Referring again to FIG. 1, conventional air interface units 120 and 122 in the mobile unit 104 and the base station 102, respectively, together with antennas 124 and 126 provide a voice channel between the mobile unit and the base station and handle such functions as selecting a radio frequency and transmitter power level for the voice channel. A base station PSTN interface 128 extends the voice channel over the link 108 to the DPU 106. When the DPU 106 permits a call, the DPU extends the voice channel over the PSTN 110 to the dialed unit 116.

Under the control of a mobile unit controller 130, an audio interface unit 132 selectively connects a speaker 134 and a microphone 136 to the voice channel, as described below. When the speaker 134 and microphone 136 are connected to the voice channel, a user can converse with a party at the dialed unit 116. Of course, the voice channel can carry signals, such as computer modem signals and facsimile signals, as well as speech signals. All conventional user-initiated signals carried over the voice channel are herein collectively referred to as "voice signals."

A modem 138 in the mobile unit 104 and a modem 140 in the DPU 106 can each be selectively connected to the voice channel and thus provide a data channel over which the mobile unit controller 130 can communicate with the DPU. Various types of modems, such as quadrature amplitude modulation (QAM) modems can be used, but we prefer to use an audio frequency-shift keying (AFSK) modem because AFSK is less sensitive to imperfections in the voice channel and is generally more cost effective.

The modems 138 and 140 send data in one or more bursts. The receive portions of the modems 138 and 140 are always connected to the voice channel so each modem can detect the beginning of any data burst that is sent by the other modem. However, the transmit portion of each modem 138 and 140 is connected to the voice channel only when a data burst is to be sent by the respective modem. Furthermore, when data is sent, the audio interface unit 132 disconnects the microphone 134 and/or the speaker 136 from the voice channel and the DPU 106 disconnects the voice channel from the PSTN 110, thus muting the voice signals to prevent voice-signal interference with the data channel and to prevent the conversing parties from hearing the data modulation.

Figure 3:
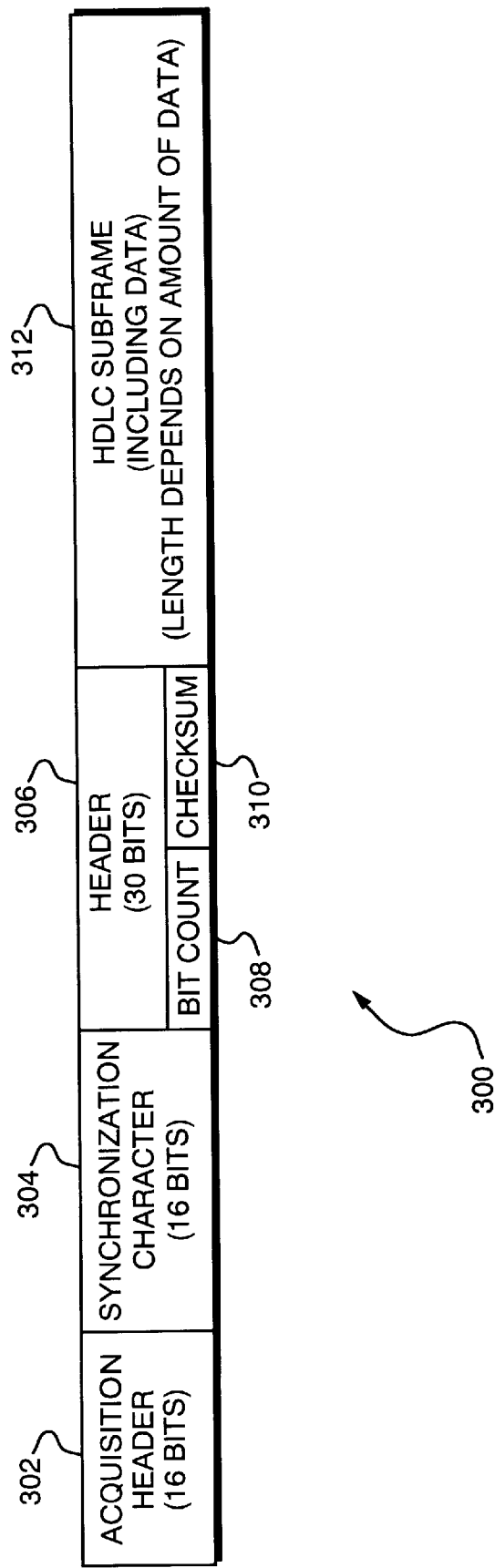
FIG. 3 is a diagram of a data burst.

FIG. 3 shows the format of a data burst 300. Each data burst 300 contains, preferably at its beginning, an "acquisition header" 302 to enable the receiving modems 138 and 140 to clock-synchronize with the bits of the data burst. Preferably, the acquisition header 302 contains the bit pattern 0101010101010101, which, we have determined, provides enough data transmissions for the receiving modems 138 and 140 to clock-synchronize, but does not reduce the throughput capacity ("bit efficiency") of the data channel by using additional bits.

A "synchronization word" 304 referably follows the acquisition header 302 and enables the receiving modems 138 and 140 to distinguish data signals from voice signals. Noise, fading and other imperfections in the voice channel can cause the receiving modems 138 and 140 to incorrectly receive one or more bits of the data burst 300. To compensate for these errors, the receiving modems 138 and 140 can treat ("recognize") a set of received bits as a synchronization word even if fewer than all of the bits match the expected synchronization word. An "error threshold" herein refers to the number of bits that can be received in error while still recognizing a set of received bits as a synchronization word.

Increasing the length of the synchronization word and/or decreasing the error threshold reduces the likelihood of recognizing a synchronization word when none is actually received (a "false start"), but it raises the likelihood that a valid synchronization word will not be recognized (a "missed start"). A missed start causes the system to retransmit a data burst and, consequently, reduces the bit efficiency of the data channel. On the other hand, decreasing the length of the synchronization word and/or increasing the error threshold raises the likelihood of a false start, which causes the system to inappropriately, albeit temporarily, mute the voice signals. We have determined that, in a typical cellular telephone voice channel, a 16-bit code synchronization word provides a reasonable tradeoff between erroneous recognition and failure to recognize a synchronization word. We prefer to use a variable error threshold, e.g. if the mobile unit controller 126 detects a high voice-to-data ratio, the controller can employ a larger error threshold to minimize disruption of the voice channel due to false starts without heavily impacting the data rate and, conversely, if the voice-to-data ratio it low, a smaller error threshold reduces the likelihood of retransmissions and therefore increases the bit efficiency of the data channel without heavily impacting the voice signals.

Returning to FIG. 3, a header 306 follows the synchronization word 304 in the data burst 300. The header 306 contains a bit count 308 of the number of data bits contained in the data burst 300 and a checksum 310 of the bit count 308. If the received checksum 310 fails to match the checksum calculated based on the received bit count 308, the voice signals are unmuted and the remainder of the data burst 300 is ignored. Thus, the checksum 310 provides an additional safeguard against erroneously recognizing data burst or incorrect length. Optionally, the mobile unit controller 130 can adjust the error threshold in response to the rate of false starts, i.e. the controller can increase the error threshold if the controller detects a high rate of false starts.

An HDLC (high-level data link control) subframe 312 follows the header 306 in the data burst 300. The HDLC subframe transports data according to a modified X.25 HDLC standard, i.e. without start/stop flags and without data transparency. Optionally, the data can be encrypted before being inserted into the HDLC subframe 312. We prefer HDLC to other protocols because it is an industry-standard protocol that guarantees accurate data delivery and enables half-duplex operation with a minimal turn-around delay at data rates used by the system.

Optionally, a (15,11) Hamming code is used to add four parity bits to each group of 11 bits in the HDLC subframe 312 to produce a series of 15-bit code words in a process known as "encoding" or "forward error correction" (FEC). FEC enables the receiving modems 138 and 140 to correct a single-bit error and to detect a double-bit error in any 15-bit code word. While other FEC schemes, such as a (7,4) code, are acceptable, we prefer to use the (15,11) code because it provides a good tradeoff between bit efficiency and an ability to correct error bits at a rate expected on a cellular telephone channel. This error correction mechanism can also provide an estimate of the data channel error rate. Preferably, the modems 138 and 140 use the following parity check matrix:

$$\overline{P} = \begin{bmatrix} 1 & 1 & 1 & 1 & 1 & 1 & 1 & 0 & 0 & 0 & 0 \\ 1 & 1 & 1 & 1 & 0 & 0 & 0 & 1 & 1 & 1 & 0 \\ 1 & 1 & 0 & 0 & 1 & 1 & 0 & 1 & 1 & 0 & 1 \\ 1 & 0 & 1 & 0 & 1 & 0 & 1 & 1 & 0 & 1 & 1 \end{bmatrix}$$

yielding a code-generation matrix:

$$\overline{G} = [\overline{I}_{11} : \overline{P}^T]$$

where $\overline{I}_{11}$ is the identity matrix of dimension 11.

The sending modems 138 and 140 can interleave the bits of the HDLC subframe 312 to overcome errors that tend to occur in bursts carried over a fading, cellular telephone channel. The header 306 can also be forward error corrected and bit-interleaved.

Returning to FIG. 1, when a user subscribes for service on the radio telephone system 100, a service provider stores, in a non-volatile, non-user-modifiable memory (NVM) 142 of the mobile unit 104 associated with the subscriber, mobile identification information that corresponds to the subscriber. The subscriber prepays for the service and the service provider stores in the database 118 the amount of money prepaid, together with the same identification information that is stored in the memory 142 of the mobile unit 104. The database 118 is stored in a conventional manner, such as on disk, tape or in random-access memory (RAM).

When a user of the mobile unit 104 attempts to make a call, the mobile unit controller 130 causes the base station 102 to establish a voice channel connection between the mobile unit and the transmit portion of the DPU 106 over the link 108. The voice channel is blocked (muted) at both ends during this phase. Then the mobile unit controller 130 sends the desired telephone number together with the identification information stored in the memory 142 to the DPU 106 using the two modems 138 and 140, as described above. The DPU 106 accesses the database 118 to ascertain the balance of money in the account corresponding to the subscriber associated with the identification information. If the balance exceeds the initial cost, e.g. air time and toll charges for, e.g. one minute of, the proposed call, the DPU 106 permits the call by forwarding the desired telephone number to the PSTN 110 and causing the DPU PSTN interface 112 to extend the voice channel over the PSTN and the voice channel at the mobile is opened. On the other hand, if the balance does not exceed the initial cost of the proposed call, the DPU 106 sends an announcement over the voice channel to the caller and it sends a command, via the modems 138 and 140, to the mobile unit controller 130. The announcement notifies the caller that the call cannot be completed and, if the call originated at the mobile unit 104, the reason. The command causes the mobile unit 104 to terminate the call.

When another party attempts to make a call to the mobile unit 104, the DPU 106 causes the base station 102 to establish a voice channel connection between the mobile unit and the DPU over the link 108. The DPU 106 and the mobile unit 104 then exchange commands and data using the modems 138 and 140, as described above. The DPU 106 causes the mobile unit 104 to send to the DPU the identification information stored in the memory 142 of the mobile unit. The DPU then accesses the database 118 and permits or denies the call, as described above. Herein, a "call attempted over the mobile telephone unit" refers to a call to or from the mobile unit.

Every minute, for the duration of a call, the DPU 106 reduces the balance in the database 118 by the cost of the preceding minute and optionally sends, via the modems 138 and 140, the remaining balance to the mobile unit 104 for display on a display screen 144. If, after any such reduction, the balance does not exceed the cost of the next minute of the call, the DPU 106 can send an announcement over the voice channel to the parties and it sends a command, via the modems 138 and 140, that causes the mobile unit 104 to terminate the call.

Numerous changes can be made in the system specifically described herein without departing from the scope of the invention. For example, the identification information stored in the memory 142 of the mobile unit 104 can be sent to the DPU 106 without muting the voice channel since the voice channel does not extend from the mobile unit 104 to the dialed unit 116 when the DPU ascertains the balance in the subscriber's account and there is little chance of voice-signal interference with the data channel. Protocols other than HDLC and error correction schemes other than FEC can be used. On some channels, error correction might not be necessary.

What is claimed is:

1. A radiotelephone system for providing prepaid mobile telephone service to subscribers, comprising:
   (a) a plurality of mobile telephone units, each:
      (i) being associated with one of the subscribers;
      (ii) storing an identification of the associated subscriber; and
      (iii) including a first modem being capable of sending the identification of the associated subscriber whenever a call is attempted over the mobile telephone unit;
   (b) a plurality of base stations, each of said base stations having means for establishing a voice channel between it and one of said mobile telephone units for each call initiated or received at said mobile telephone unit and said base station also having means for controlling calls and providing control information and power level information between said base station and one of said mobile telephone units for mobile telephone service being provided to said mobile telephone unit; and
   (c) a debit processing unit having a link to at least one of said base stations and also having:
      (i) means for storing a database, for each subscriber the database contains a balance of money remaining in an account corresponding to the subscriber;
      (ii) a second modem connected to a point along the voice channel, said second modem being in data communication with said first modem, said second modem including means for receiving information over said voice channel established by said base station in bursts in a blank-and-burst format, the first and second modems sending signals to and receiving signals from each other in bursts, each said burst comprising a synchronization word having a variable error threshold and said synchronization word for enabling one of said modems that is receiving said burst to differentiate the burst from the voice signals carried over the voice channel, the voice signals being muted during each burst, whereby the first and second modems provide a data channel between the mobile telephone unit and the debit processing unit seemingly concurrently, and with minimal interference with the voice signals that are being carried over the voice channel, and without requiring modifications to the base station, and wherein said information being sent over the voice channel includes the identification of the associated subscriber sent by one of the plurality of mobile telephone units when a call is attempted over the mobile telephone unit; and (iii) means for selectively permitting, over said link, the call to be connected if the balance of money remaining in the account corresponding to the associated subscriber exceeds a first specified amount, and if the call is permitted, reducing the balance of money remaining in the account corresponding to the associated subscriber; and (iv) means for denying, over said link, said call by sending a command to said mobile unit associated with the subscriber to terminate the call if said balance is below said first specified amount.

2. The radiotelephone system defined in claim 1, wherein said synchronization word:

is a 16-bit code word.

3. The radiotelephone system of claim 1, wherein said link between said base station and said debit processing unit is one of permanent, switched, wire or wireless.

4. The radiotelephone system defined in claim 1, wherein the first and second modems use audio frequency-shift keying (AFSK) to respectively send and receive the identification of the associated subscriber.

5. The radiotelephone system defined in claim 4, wherein:

(a) the first and second modems respectively send and receive the identification of the associated subscriber in at least one burst of data;

(b) the first modem sends a synchronization word at the beginning of each burst of data;

(c) the second modem detects the beginning of each burst of data by the presence of the synchronization word; and (d) the associated mobile telephone unit mutes the voice signals during each burst of data.

6. The radiotelephone system defined in claim 1, wherein during a call, the debit processing unit:

(a) periodically reduces the balance of money remaining in the account corresponding to the associated subscriber; and (b) if the balance of money remaining in the account corresponding to the associated subscriber becomes less than a second specified amount, terminates the call.

7. The radiotelephone system defined in claim 6, wherein:

(a) at least one of the plurality of mobile telephone units further comprises means for displaying the balance of money remaining in the account corresponding to the subscriber associated with the mobile telephone unit; and (b) the debit processing unit periodically causes the at least one mobile telephone unit to display the balance of money remaining in the account.

8. The radiotelephone system of claim 7, wherein each said burst of said blank-and-burst communication further comprises an acquisition header for enabling one of said first and second modems that is receiving a signal in said burst to clock-synchronize with the remainder of the burst.

9. The radiotelephone system of claim 8, wherein said acquisition header is a code of between 12 and 20 bits.

10. The radiotelephone system of claim 8, wherein each burst further comprises a subframe for transporting data, the data comprising groups of data bits, the sub-frame comprising code words, wherein each group of data bits is encoded to form one of the code words.

11. The radiotelephone system of claim 10, wherein a forward error correction code is used to encode each group of data bits to form one of the code words.

12. The radiotelephone system of claim 11, wherein the forward error correction code is a (15,11) Hamming code.

13. A method of providing prepaid mobile telephone service to subscribers, in a mobile telephone system having a plurality of mobile telephone units each including a first modem and each being associated with one of the subscribers, and a plurality of base stations which establish a voice channel between the base station and a mobile unit for each call initiated or received at said mobile unit and said base station, and a second modem connected to a point along the voice channel, said second modem being in data communication with said first modem, the method including the steps of:

(a) storing an identification of one of the subscribers in each said mobile telephone unit;

(b) storing a data base in an associated data storage device containing the subscriber's identification and a balance of money remaining in an account corresponding to that subscriber;

(c) when a call is initiated by one of said subscribers, establishing a voice channel between said mobile telephone unit of said subscriber and said base station;

(d) transmitting the subscriber's identification and corresponding balance of money remaining in an account over said voice channel in a burst of data over said voice channel, including:

1. sending at the start of said burst a synchronization word having a variable error threshold, and said synchronization word for enabling one of said first and second modems that is receiving said burst to differentiate the burst from the voice signals carried over the voice channel;

2. muting said voice signals during each said burst;

3. selectively permitting the call to be connected if the balance of money remaining in the account corresponding to the associated subscriber exceeds a predetermined amount, and denying the call if said balance is below a predetermined amount;

4. upon permitting the call, reducing the balance of money remaining in the account corresponding to the associated subscriber.

14. The method of claim 13 including said synchronization word being a 16-bit code.

15. The method of claim 13 including the step of:

sending as a component of said burst an acquisition header for enabling one of said first and second modems that is receiving a signal in said burst to clock-synchronize with the remainder of the burst.

16. The method of claim 15 including the step of:

sending said acquisition header as a code of between 12 and 20 bits.

17. The method of claim 16 including the step of:

sending as a component of said burst a subframe for transporting data, the data comprising groups of data bits, the subframe comprising code words wherein each group of data bits is encoded to form one of the code words.

18. The method of claim 17 including the step of:

encoding each group of data bits of said burst using forward error correction.

19. The method of claim 18 including the further step of:

employing a forward error correction code that is a (15,11) Hamming code.

* * * * *